United States Patent [19]

Poland

[11] Patent Number: 4,902,883

[45] Date of Patent: Feb. 20, 1990

[54] DIGITIZED VIDEO SIGNAL AND TIME INTERVAL MEASUREMENT TRANSMISSION FROM A BAR CODE READER

[75] Inventor: Mckee D. Poland, Portola Valley, Calif.

[73] Assignee: Hewlett-Packard Company, Palo Alto, Calif.

[21] Appl. No.: 149,453

[22] Filed: Jan. 28, 1988

[51] Int. Cl.$^4$ ............................................... G06K 7/10
[52] U.S. Cl. ..................................... 235/462; 235/470; 235/472
[58] Field of Search .................... 235/462, 470, 472

[56] References Cited

U.S. PATENT DOCUMENTS 3,949,363  4/1976  Holm .............................. 235/462 X
4,411,016  10/1983  Wakeland ...................... 235/462 X
4,682,015  7/1987  Quan .................................. 235/472

Primary Examiner—David L. Trafton
Attorney, Agent, or Firm—Douglas A. Kundrat

[57] ABSTRACT

A bar code reader comprises a smart scanner with a processor that can be configured to send to the host either (a) the digitized video signal from the scanner's optical section, (b) the unprocessed time interval data measured from the transitions of the video signal, (c) the decoded data message, or (d) the combination of (b) and (c).

12 Claims, 3 Drawing Sheets

DIGITIZED VIDEO SIGNAL AND TIME INTERVAL MEASUREMENT TRANSMISSION FROM A BAR CODE READER

BACKGROUND AND SUMMARY OF THE INVENTION

Conventional bar code readers consist of an optical scanning portion and a portion to decode the optical data. The scanning portion contains an optoelectronic device which senses the reflectivity of the bar code label and produces a digital video signal whose pulse widths correspond to the widths of the bars and spaces scanned. The decoding portion monitors the video signal, measures the pulse widths, and translates the measurements into the characters encoded in the label.

Bar code readers can be divided into two types. One type incorporates a "digital" scanner. In this type of reader, the optoelectronic portion of the reader is physically separate from the decoding function. The scanner portion is called "digital" because it emits only the digital video signal, and no processing of the video data it collects is done inside the scanner itself. Rather, the decoding function is performed by hardware and software located in a separate component. That component can be a dedicated decoder box that in turn is connected to a host computer system. Alternatively, the decoding component can reside in a host system that performs other functions as well, such as a data entry terminal, a computer, or a cash register.

The other type of reader is generally referred to as a "smart scanner". In this type of reader, the hardware and software necessary to perform the decoding function are incorporated into the scanner itself, along with the optoelectronic section. The output of the scanner is decoded data, which is transmitted to the host system using a standard I/O interface, relieving the host of the decoding task.

In both types of readers, the term scanner applies to bar code wands, slot readers, moving beam laser scanners, CCD scanners, and others.

One shortcoming of conventional smart scanners is that they only provide data that has already been processed by the smart portion of the scanner, and the host does not have access to the raw data from the optical section. For some applications, such as decoding with non-standard decoding algorithms not available in conventional bar code readers, or analysis of label printing characteristics, the host needs to be able to process the optical data from the digital portion of the scanner. With a conventional smart scanner, the host can acquire only decoded bar code data characters through its interface to the smart scanner. The host can access neither the digitized video signal corresponding to the bars and spaces of a bar code label during a scan, nor the array of time intervals measured from transitions of that video signal. The program in the smart scanner which processes the raw data is generally fixed in ROM, offering little flexibility for the host system to customize its functions.

For applications that require access to either the unprocessed optical data or the decoded data from bar code scans, or both, the host system can be designed to receive input from a digital scanner as well as a smart scanner. However, this requires the duplication in the host system of the time interval measurement hardware that exists in the smart scanner, and also requires the host system to perform the data acquisition task. The time measurement hardware adds cost to the host system, and the acquisition function at least partially occupies the host's processor during each scan.

An object of the invention is to avoid replication in the host system of the time interval measurement hardware and data acquisition capability that exist in a smart scanner, merely to allow the host system to use a digital scanner and measure its digitized video output signal. Eliminating the measurement hardware from the host system reduces its cost, and offloading the acquisition task saves the host's CPU time.

Another object of the invention is to provide a bar code reader that not only contains all of the necessary hardware to acquire time interval data and decode that data into characters, but allows the host system to which it is connected the flexibility to access (a) the digitized video signal, (b) the array of time intervals from a scan, and (c) the decoded data.

These and other advantages are provided by the bar code scanner of the invention which comprises a smart scanner with a processor that can be configured to send to the host either (a) the digitized video signal from the scanner's optical section, (b) the unprocessed time interval data measured from the transitions of the video signal, (c) the decoded data message, or (d) the combination of (b) and (c).

Configuration (a) is called feedthrough mode, because the processor in the smart scanner merely feeds the video signal through to the I/O interface without performing any time interval measurement or decoding. Configuration (b) is called element time interval dump mode, or ETI dump mode. In this mode the bar and space elements of the bar code label being scanned are measured as time intervals between transitions of the video signal. The element time intervals, ETIs, are collected in an array by the smart scanner's processor, and transmitted in a convenient format to the host. Configuration (c) is the standard output mode of a smart scanner. Configuration (d) combines the outputs of modes (b) and (c) by first transmitting decoded data from a scan, then the ETIs that were measured in the scan. These configurations can be selected by means of commands to the smart scanner, issued from the host through the I/O interface. Alternatively, configuration selections can be made by the operator by scanning a bar code configuration menu.

DETAILED DESCRIPTION OF THE INVENTION

In the preferred embodiment, the invention is implemented in a bar code scanning wand with an integrated decoder and a serial ASCII I/O interface. This type of wand is referred to as a smart wand. The invention could also be implemented in other types of smart bar code scanners, including laser scanners and CCD imaging scanners.

Figure 1:
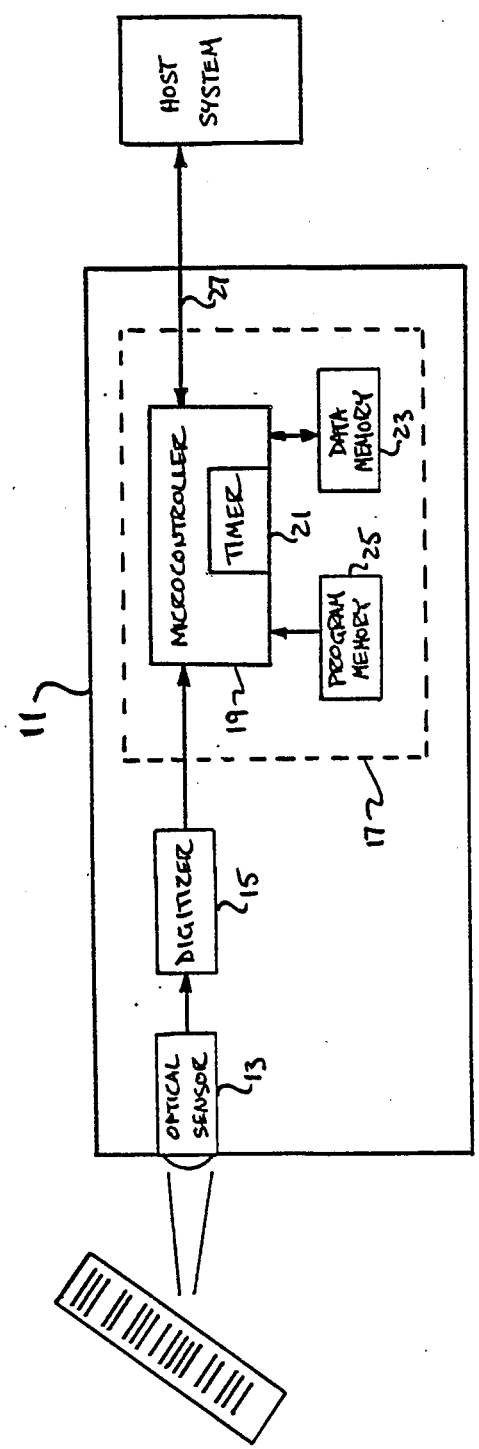
FIG. 1 shows a block diagram of a bar code reader constructed in accordance with the invention.

A block diagram of a smart wand 11 incorporating the invention is shown in FIG. 1. The wand 11 can be thought of as a "digital" section comprised of optical sensor 13 and digitizer 15, and a "smart" section comprised of decoder 17. The decoder 17 includes microcontroller 19, data memory 23 and program memory 25. The decoder 17 could also be implemented with a microprocessor and separate supporting circuits.

As the wand 11 is scanned across a bar code label, the optical sensor 13 produces an analog signal representing the label's reflectivity, modulated by the passing of the bars and spaces on the label. This analog signal is fed directly to the digitizer 15, where it is amplified and converted into a digitized video signal. This digital signal is the normal output of a digital wand. It is a pulse train at standard logic levels, with positive and negative pulse widths corresponding to the bar and space widths, respectively. Each positive transition in the video signal occurs when the wand passes from a space to a bar, each negative transition when the wand passes from a bar to a space.

From the digital section of the wand 11, the digitized video signal is fed into the decoder 17 of the smart section, to a microcontroller 19. The microcontroller 19 contains a timer 21 to measure the pulse widths of the video signal, that is, the time intervals between transitions of the video signal that correspond to the widths of the bar and space elements of the bar code. The resulting element time intervals, ETIs, one per bar or space element, form an array stored by the microcontroller 19 in data memory 23.

At the completion of the bar code scan, the ETIs are read by the microcontroller 19 from the data memory 23 and translated into decoded ASCII characters by decoding algorithms which reside in program memory 25. The microcontroller then transmits the ASCII data on the serial I/O channel 27 to the host system.

The decoded ASCII character data is normally the only output from a smart wand available to the host system. In the bar code reader of the invention, however, the data transmitted to the host system is not limited to the decoded ASCII character data described above. The digitized video signal output from the digitizer 15 and the time interval measurements stored in data memory 23 also can be directed to the serial I/O port. In addition to controlling many options pertaining to decoding and I/O functions of the bar code reader, the configuration programmed into microcontroller 19 determines which data is directed to the serial I/O port 27.

In the preferred embodiment of the invention, the configuration of microcontroller 19 can be performed either of two ways. The first way is to send commands from the host through the serial I/O port 27 to the microcontroller 19 in the smart wand. Configuration commands from the host are expressed in compact character sequences. The second way to configure the smart wand is to scan special labels from a bar code menu to set the configuration options. One method of encoding configuration information in bar code labels and of interpreting those labels in the smart wand is described in a copending application "Bar Code Reader Configuration and Control Using a Bar Code Menu to Directly Access Memory", assigned in common with this application to Hewlett-Packard Co.

Figure 2:
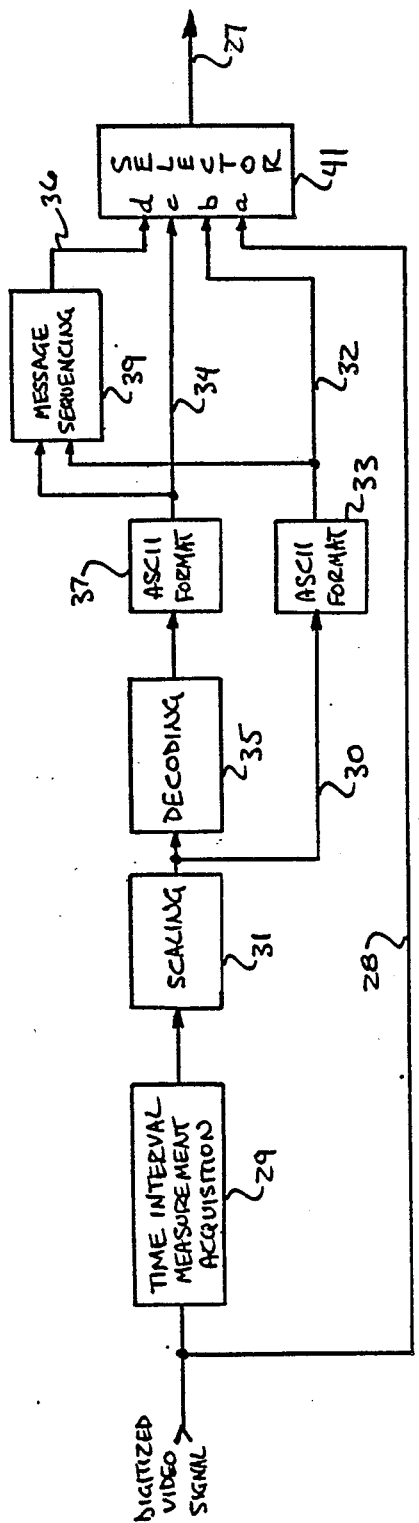
FIG. 2 is a functional block diagram of the decoder section of the bar code reader shown in FIG. 1, showing the alternate data paths that are implemented in a bar code reader which incorporates the invention.

FIG. 2 is a functional block diagram of the decoder section 17 of the smart wand 11, showing the data paths made available by the invention. The blocks shown in FIG. 2 represent the major data processing steps performed by microcontroller 19.

The digitized video signal from digitizer 15 goes to the time interval measurement acquisition block 29, which produces a group of element time intervals, or ETIs, at the conclusion of each scan. Next, the ETIs go through scaling block 31, discussed in detail below. The main purpose of scaling is to remove the effects of scanning velocity changes during the scan. The scaled ETIs go to the decoding block 35, which translates the data into decoded characters.

ASCII formatting block 33 converts the scaled ETIs received on line 30 to a set of ASCII ETIs, suitable for transmission via the serial I/O port 27 to the host system. ASCII formatting block 37 converts the decoded characters from decoding block 35 to a set of ASCII characters, suitable for transmission via the serial I/0 port 27 to the host system.

Message sequencing block 39 combines the ASCII formatted ETI data from block 33 and the ASCII formatted decoded characters from block 37 into a combined message. The two blocks of data are separated by delimiters, with the decoded character data first. If the scan was not decodable, no character data is produced by the decoding block 35, and only the ETI data goes through the message sequencing block 39.

Depending on the configuration of the decoder, the selector 41 chooses one of four different data paths. In configuration (a), the feedthrough mode, the selector 41 connects the output line 28 from digitizer 15 to the serial port I/O line 27, continuously echoing the digitized video signal to the output line, so smart wand 11 outputs video signal data like a digital wand. In configuration (b), the ETI dump mode, the selector 41 connects the output line 32 from ASII formatting block 33 to the serial port I/O line 27, transmitting scaled ETI values for each scan to the host system. In configuration (c), the common usage of a smart wand, the selector 41 connects the output line 34 from ASCII formatting block 37 to the serial port I/O line 27, transmitting decoded characters to the host system.

The smart wand of the preferred embodiment of the invention also supports configuration (d). In this configuration, the selector 41 connects the output line 36 from message sequencer 39 to the serial port I/O line 27, transmitting both the ETI data and the decoded character data, separated by delimiters, to the host system.

The scaling block 31 shown in FIG. 2 improves the content of the ETI dump message. The scaling and compensation process is described in a copending application, "Means and Method of Scaling Time Interval Measurements from an Optical Bar Code Scanner to Improve Decoder Efficiency", assigned in common with this application to Hewlett-Packard Co. The scaling process compensates for the effect of scan acceleration, and simplifies the processing requirements of the host by offering ETIs as 8 bit quantities. As an operator scans a bar code label, the actual values of ETIs are dependent not only on the widths of the bars and spaces in the label, but also on the instantaneous velocity of the wand. ETIs from bar code scans can fall anywhere in a range from 100 microseconds to 50 milliseconds. The scaling block 31, however, scales the ETI values so that they can be represented in a single byte range, 1 to 255 counts, regardless of changes in scan velocity. The scaling process tends to keep the ETI values in the range of 30 to 160 counts, yet it maintains the relative proportions of each ETI to nearby ETIs.

Figure 3:
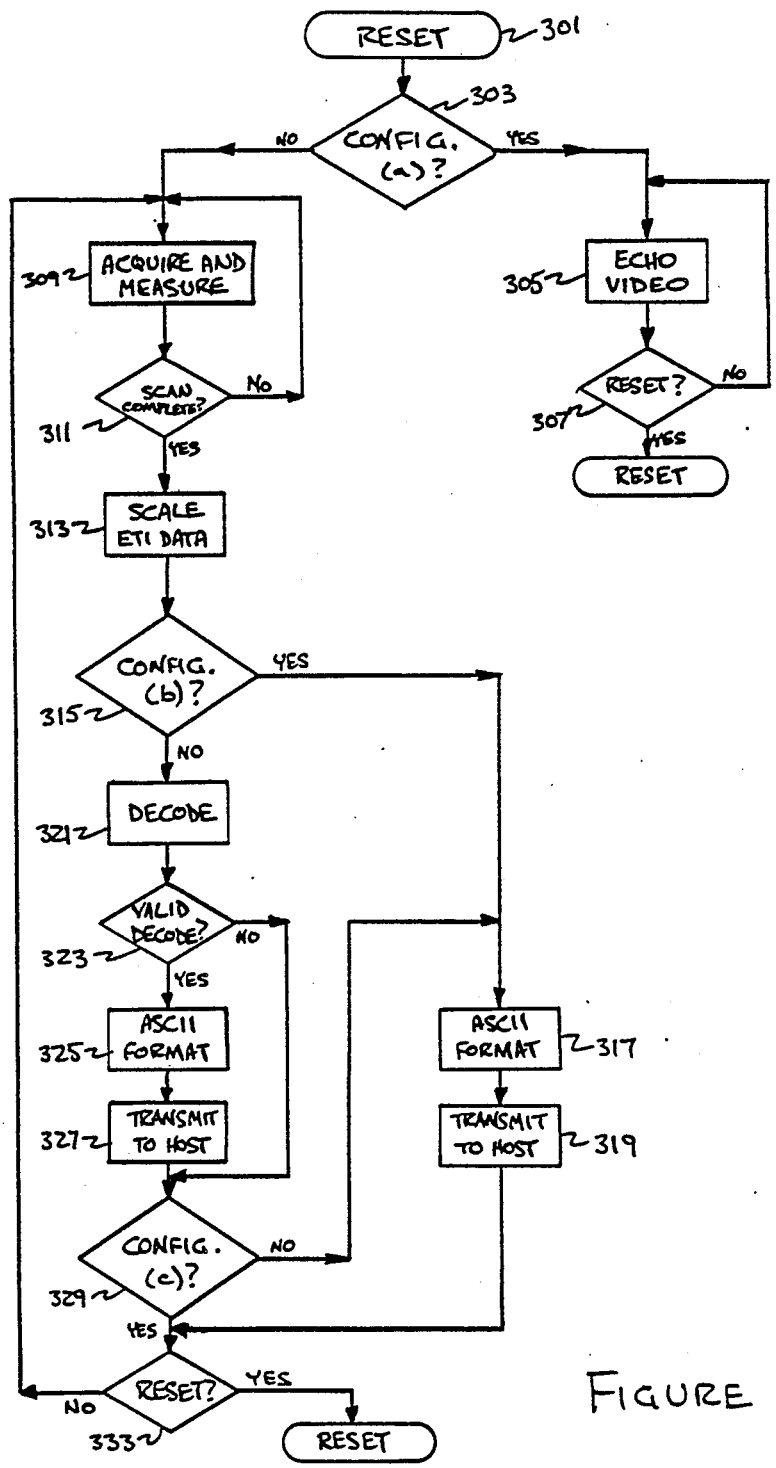
FIG. 3 is a flow chart of the program that controls the operation of the processor in the bar code reader of FIGS. 1 and 2.

FIG. 3 is a flow chart of the program stored in program memory 25 and executed by microcontroller 19. Upon powering up, or at a reset command from the host system, the program begins operation at reset block 301. From block 301, control flows to decision block 303, to determine if configuration (a) was selected. If configuration (a) has been selected, the microcontroller goes into the feedthrough mode, performing a loop comprising blocks 305 and 307, until a reset signal is received. In block 305 the output on the serial I/O port echoes the digitized video signal from the digitizer 15. If configuration (a) was not selected, control passes to block 309 and microcontroller 19 begins data acquisition and measurement.

In block 309, microcontroller 19 acquires the data from the bar code scan, by measuring the element time intervals, ETIs, between transitions of the digitized video signal from digitizer 15. Data acquisition and measurement continues until the bar code scan has been completed, as determined at block 311. When the bar code scan is complete, the microcontroller 19 scales the ETI data, block 313, and stores the scaled ETI data in an array in data memory 23.

From block 313, control flows to decision block 315, to determine if configuration (b) was selected. If configuration (b) has been selected, the microcontroller goes into the ETI dump mode, branching to block 317. The ETI data is formatted into ASCII at block 317, and at block 319 the resulting ASCII message is transmitted to the host system on the serial I/O port 27. The microcontroller returns to block 309 to acquire data for the next bar code scan unless a reset signal was received, as determined at decision block 333.

If configuration (b) was not selected, the microcontroller attempts to decode the ETI data at block 321, and determines if the data was validly decoded at decision block 323. If the scan was validly decoded, the decoded data is formatted into ASCII at block 325, and at block 327 the resulting ASCII message is transmitted to the host system on the serial I/O port 27. From block 327, or if the data was not validly decoded, from block 323, control passes to decision block 329, to determine if configuration (c) was selected. If configuration (c) was selected, the microcontroller returns to block 309 to acquire data for the next bar code scan, unless a reset signal was received, as determined at decision block 333.

If configuration (c) was not selected, the microcontroller must be in configuration (d), and the ETI data must be transmitted to the host system. Control passes from block 329 to block 317, the ETI data is formatted into ASCII, and at block 319 the resulting ASCII message is transmitted to the host system on the serial I/O port 27. From block 319 the microcontroller returns to block 309 to acquire data for the next bar code scan unless a reset signal was received, as determined at decision block 333.

I claim:

1. A bar code reader for scanning data from bar codes for input to a host computer system, comprising:
   means for producing a digitized video signal representing the reflectivity of the bars and spaces of the bar code;
   decoding means for receiving the digitized video signal, for measuring the pulse widths of the video signal that correspond to the widths of the bar and space elements of the bar code to produce element time interval data, and for translating the time interval data into decoded ASCII characters; and
   means for transmitting data to a host computer system, the transmitting means having an adjustable configuration that determines whether the digitized video signal, the element time interval data, the decoded ASCII characters, or a combination thereof, is transmitted to the host system.

2. The reader of claim 1 wherein the decoding means comprises a processor and the configuration of the processor determines whether the digitized video signal, the element time interval data, the decoded ASCII characters, or combinations thereof, are transmitted to the host system.

3. The reader of claim 2 wherein the configuration of the processor is set by commands received from the host computer system.

4. The reader of claim 2 wherein the configuration of the processor is set by scanning bar code labels containing configuration commands.

5. The reader of claim 1 wherein the decoding means includes means for scaling and compensating the element time interval data to remove acceleration effects and to express the data as single byte values before the element time interval data is decoded into ASCII characters or transmitted to the host computer system.

6. The reader of claim 2 wherein the decoding means includes means for scaling and compensating the element time interval data to remove acceleration effects and to express the data as single byte values before the element time interval data is decoded into ASCII characters or transmitted to the host computer system.

7. A bar code reader for scanning data from bar codes for input to a host computer system, comprising:
   optical sensor means for producing an analog signal modulated by the passing of bars and spaces on a bar code label, representing the reflectivity of the bars and spaces of the bar code label;
   digitizer means for receiving and amplifying the analog signal from the optical sensor means, and converting the analog signal into a digitized video signal;
   decoding means for receiving the digitized video signal from the digitizer means, for measuring the pulse widths of the video signal that correspond to the widths of the bar and space elements of the bar code to produce element time interval data, and for translating the time interval data into decoded ASCII characters; and
   means for transmitting data to a host computer system, the transmitting means having an adjustable configuration that determines whether the digitized video signal, the element time interval data, the decoded ASCII characters, or a combination thereof, is transmitted to the host system.

8. The reader of claim 7 wherein the decoding means comprises a processor and the configuration of the processor determines whether the digitized video signal, the element time interval data, the decoded ASCII characters, or combinations thereof, are transmitted to the host system.

9. The reader of claim 8 wherein the configuration of the processor is set by commands received from the host computer system.

10. The reader of claim 8 wherein the configuration of the processor is set by scanning bar code labels containing configuration commands.

11. The reader of claim 7 wherein the decoding means includes means for scaling and compensating the element time interval data to remove acceleration effects and to express the data as single byte values before the element time interval data is decoded into ASCII characters or transmitted to the host computer system.

12. The reader of claim 8 wherein the decoding means includes means for scaling and compensating the element time interval data to remove acceleration effects and to express the data as single byte values before the element time interval data is decoded into ASCII characters or transmitted to the host computer system.

* * * * *